Aug. 21, 1962   L. A. RICHARDS   3,049,914
GAGE ASSEMBLY AND ATTACHMENT FOR SOIL-MOISTURE TENSIOMETERS
Filed July 30, 1959
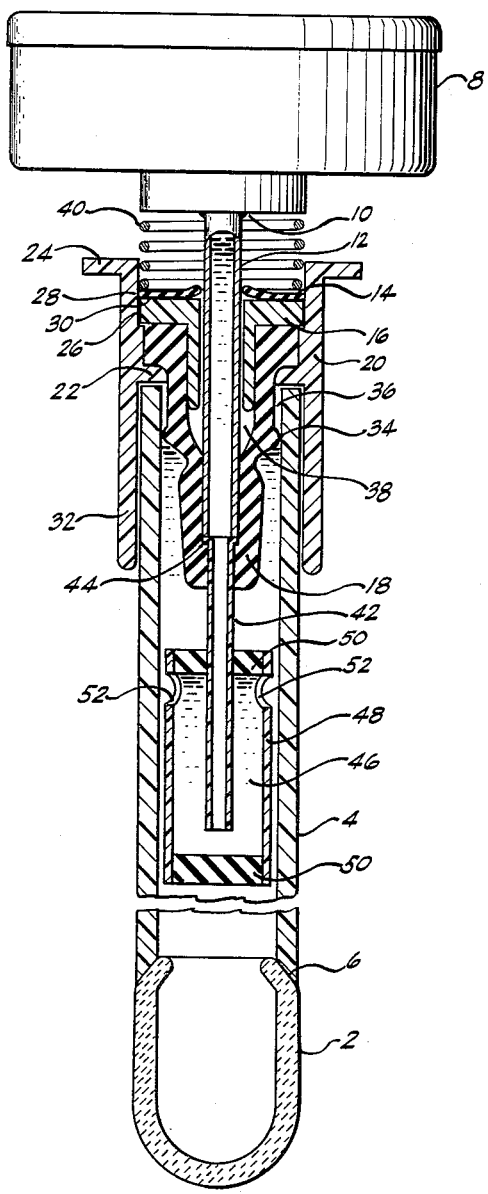
INVENTOR.
LORENZO A. RICHARDS
BY
AGENT

United States Patent Office 3,049,914
Patented Aug. 21, 1962

3,049,914
GAGE ASSEMBLY AND ATTACHMENT FOR
SOIL-MOISTURE TENSIOMETERS
Lorenzo A. Richards, 4455 5th St., Riverside, Calif.
Filed July 30, 1959, Ser. No. 830,580
8 Claims. (Cl. 73—73)

My invention relates to improved gage-type soil-moisture tensiometers, and more particularly to a simplified gage assembly permitting easy attachment to or removal from the soil tube of a soil-moisture tensiometer.

Essentially, a soil-moisture tensiometer consists of a water-filled system provided with a means for determining vacuum in the system. This system, which is generally tubular, comprises a soil tube with which the vacuum gage or other means of determining vacuum communicates, and a porous ceramic cup or tube section attached to said soil tube at the lower end thereof. Generally the soil tube is made of transparent material so that air in the system can be readily observed, and it is desirable that the vacuum gage or gage assembly can be readily removed and replaced. Such tensiometers are used in agriculture for measuring the condition of water in soil. By means of such tensiometers, it is possible to determine the need for irrigation, among other things.

In the past the use of tensiometers by farmers, gardeners and the like has been limited by the cost of the units and the expense and trouble of maintaining the units in operable condition. Tensiometers which include mercury manometers for determining vacuum have been cumbersome and such units are highly susceptible to breakage, loss of mercury, and the like. Tensiometers using gages require gage replacement, calibration, etc. Moreover, these units require servicing whenever an appreciable amount of air accumulates in the soil tube. Air accumulation is more or less inevitable, since air dissolves in water and thus is released when vacuum is applied. Air enters the system through leaks in the porous cup, joints in the system, or even from diffusion through other parts of the tensiometer as, for example, rubber stoppers, gaskets, and even through the walls of the vacuum system. Materials of construction, even though normally considered to be non-permeable to air, are permeable to a slight degree, and thus air does tend to accumulate within a tensiometer. Consequently, the design of the instrument should minimize the number of joints in the system and must incorporate means for detecting and removing air. The various features of the tensiometer and particularly of the means for sealing the gage assembly to the top of the soil tube described herein comprise a substantial improvement in gage-type tensiometers.

The objects of my invention are:

(1) To provide a gage assembly and attachment for soil-moisture tensiometers that can be removably sealed against the inner wall of a straight, unmodified, cylindrical soil tube.

(2) To provide a gage assembly that can be used with a minimum of time expended for effecting attachment and removal, and for servicing, i.e., removing air such as by filling with water.

(3) To provide a gage assembly and attachment arranged so that damage to the vacuum gage caused by excess pressure during insertion of the gage assembly into the soil tube filled with water is precluded.

(4) To provide a gage attachment comprising an "unsupported area" type gasket closure.

(5) To provide a gage assembly which does not require the use of threads, latches or clamps to effect attachment, thus permitting the removal of the gage assembly and the release of vacuum in the system without unnecessary complication.

(6) To provide a liquid-filled reservoir removably attached to a gage tube communicating with the gage itself to insure maintenance of liquid fill in the gage upon release of vacuum in the system, even though air has accumulated in the soil tube.

(7) To provide ready interchangeability of gage assemblies and soil tubes, thus eliminating the need for removal of the complete tensiometer from the soil when it becomes necessary to remove the gage for repair, calibration, or storage.

(8) To provide versatility of type of installation as to depth and placement of tensiometers by the use of several soil tubes with a lesser number of mounted gages, i.e., by moving a gage assembly from one soil tube to another.

(9) To facilitate bulk shipment of tensiometers by providing gage assemblies which can be separately boxed and shock-mounted, and soil tubes having ceramic cups attached which can be compactly bundled.

With the above and other objects in view as may appear hereinafter, reference is now directed to the accompanying drawing which is a partial sectional view of a complete soil-moisture tensiometer comprising a ceramic cup 2 connected to a transparent plastic soil tube 4 by means of cemented joint 6. Cements such as those prepared from the plastic employed in said soil tube using suitable solvents therefor are useful in making this connection. Porous ceramic cups suitable for this purpose are well known and need not be further described. A conventional Bourdon-type vacuum gage 8 is welded or soldered or otherwise connected at 10 to a metal gage extension tube (or simply gage tube) 12. This tube is preferably made of brass or stainless steel. Tube 12 is inserted through dirt shield 14, which is in the form of a washer and is made of pliable synthetic or natural rubber or the like, preferably neoprene, through molded plastic part 16 which serves as a guide for tube 12, and into the lower part of boot 18 in which it is held by the tight fit and resiliency of the boot. The dirt shield prevents dirt, dust, moisture and the like from entering and clogging the slip joint where tube 12 passes through part 16. Part 16 consists of a hollow cylindrical plastic part having an external circular flange at the upper end thereof. Molded plastic part 20 is a hollow cylinder having an internal circular flange 22 intermediate between the ends of the cylinder and an external circular flange 24 at the upper end thereof, and is sealed to the flange of plastic part 16 at 26 by means of a press fit, or preferably it is welded at this point by means of solvent or a cement prepared by dissolving the plastic in a solvent. Dirt shield 14 is also preferably cemented peripherally to part 20 at 28 and to the flange of part 16 at 30 by means of cement. The lower skirt 32 of hollow cylindrical plastic part 20 provides an alignment guide for the gage assembly on the cylindrical tube 4 which is the soil tube of the tensiometer. Internal flange 22 on plastic part 20 serves as a support for the upper part of boot 18 and as a stop against the top of soil tube 4. Exterior flange 24 on plastic part 20 serves as a means for lifting the gage assembly from the soil tube as will be more fully described hereinafter.

Boot 18 consists of (a) a lower hollow cylindrical portion in which the internal circular hole changes from a larger to a smaller diameter at approximatey the midpoint. Gage tube 12 extends into and fits tightly in the larger diameter part of the circular hole, (b) an intermediate, larger diameter modified hollow cylindrical section having an external circular ridge or ring seal 34 which has an external configuration similar to that of an O ring intermediate between the ends of said intermediate section, and (c) an upper section consisting of a circular flange having an inside diameter the same as the diameter of the hole in said intermediate section, which flange is supported by and retained between the flange of part 16 and the interior flange 22 of part 20. The ridge 34 of boot 18 contacts the inner surface of soil tube 4 and forms the vacuum seal in the tensiometer.

Boot 18, as it comes from the mold and is undeformed, is sized so that the outside diameter of the ring seal 34 is slightly larger than the inside diameter of soil tube 4. After assembly, therefore, there is an elastic force having its origin in the internal stress in the boot which forces the seal against the tube. The lower, smaller diameter cylindrical portion of the boot is smaller in diameter than the internal diameter of tube 4 and, in fact, the intermediate cylindrical portion of the boot, other than that portion referred to as the ring seal, is also smaller in diameter than the internal diameter of tube 4. Upon assembly, the flange portion of the boot and the upper part of the intermediate hollow cylindrical portion fits tightly around the outside of the hollow cylindrical portion of plastic part 16. The intermediate hollow cylindrical portion is so sized that it leaves an annular air space or chamber 36 between the outside of the boot and the upper part of tube 4. Moreover, an annular air space or chamber 38 is left between the intermediate hollow cylindrical portion of the boot and tube 12. With this arrangement, the boot is unsupported in the area between the bottom of the hollow cylindrical portion of plastic part 16 and the top of the lower hollow cylindrical portion of the boot except for the point at which the ring seal touches the internal surface of soil tube 4.

The seal is designed to prevent external air at atmospheric pressure from entering the liquid-filled vacuum system inside the tensiometer, and it is important that this seal be as nearly perfect as possible. It is well known that the line seal of O rings, especially when gasket pressure is enhanced by the "unsupported area" principle, provides about the best type of seal known. This principle is commonly used in science and technology for holding pressure differences of fluids. The shape of the portion of the boot lying between chamber 38, which contains air at atmospheric pressure, and the space inside tube 4 beneath seal 34, which contains liquid at reduced pressure or vacuum, is such that the resultant action on the boot caused by the pressure difference forces the ring seal 34 against the internal wall of tube 4. The higher the pressure difference, the tighter the seal. This is the "unsupported area" principle. The unsupported area is that area as described above where the intermediate cylindrical portion of the boot is not supported by any structure except at the ring of contact 34 at which the seal is made. The result of the force due to pressure difference between the air in chamber 36 at atmospheric pressure and the water in tube 4 at reduced pressure is downward and tangential to the walls of tube 4. Friction at the seal prevents relative motion in response to this force, but the force does beneficially contribute to the over-all vacuum force tending to hold the mounted gage assembly on soil tube 4 when there is a vacuum or suction in the tensiometer.

Also, although its use is not generally required, a coil spring 40 may be and is sometimes preferably employed. This spring supports the weight of the gage and tends to lift the gage and attached tube 12, thus tending further to press ring seal 34 against the inside walls of tube 4.

Extending from the bottom of the boot and fitting into the smaller diameter hole at the lower end of the lower hollow cylindrical portion of the boot, thus extending the passageway of gage tube 12, is a short section of plastic or other tube 42 which is of smaller diameter than tube 12 and which will be referred to as gage tube extension. Preferably this tube is flanged at its upper end, the flange 44 fitting into the bottom of the larger diameter hole in the lower section of the boot. This tube carries a water reservoir 46 consisting of a relatively thin-walled plastic tube 48 intermediate in diameter between tube 42 and tube 4, the ends of which are sealed by means of neoprene or rubber plugs 50, tube 42 extending through the upper of said plugs. It is obvious that lower plug 50 can be eliminated by using a closed end tube. In tube 48 immediately below the upper plug 50 are holes 52, shown as circular holes, to permit entry of water into the reservoir. It is apparent that these holes may be of any other shape, such as slots, square-shaped, etc., so long as they are large enough to permit the entry of water. Since reservoir 46, once it is filled, will always contain water and since tube 42 extends to a point near the bottom of said reservoir, the end of tube 42 is always immersed in water so that when the vacuum is released, such as when the gage assembly is removed from the soil tube, there is no chance of air entering the gage tube and passing into the Bourdon tube of the gage itself. Other means of preventing entry of air into the gage, such as those described in my copending application Serial No. 801,187, may be employed. Thus, the means shown in FIGURE 2 of that application, in which a rubber or pliable plastic bag is sealed onto the gage tube extension, corresponding to tube 42 in the drawing of this application, can be used in place of the reservoir shown herein. The use of the bag permits filling the gage, gage tubes and the bag with water or with an antifreeze liquid or solution. This principle is within the scope of the present invention.

To place a gage in service, it and the extension tubes are completely filled with water by any means, such as by cycling with a suction bulb filled with water, with the gage in an upside-down position, and with reservoir 46 removed from gage tube 42. The reservoir is then attached, and when the gage assembly is inserted in the water-filled soil tube 4 the reservoir fills with water and air is completely eliminated from the tensiometer system. Thereafter, if air appears in the tensiometer soil tube it can be removed by removing the gage assembly, refilling the soil tube, and re-inserting the gage assembly. This is accomplished by depressing the gage with the thumb while supporting the assembly with two fingers underneath external circular flange 24. As flange 24 is lifted and the gage is depressed, tube 12 slides through plastic part 16 and stretches boot 18. As boot 18 is stretched, seal 34 is broken, permitting movement of the gage assembly in or out of tube 4.

As illustrated and described herein, the tensiometers of my invention are provided with but a single opening at the top of the soil tube. This single opening serves the dual purpose of providing an opening into which the vacuum gage is connected and sealed and through which water is added when necessary. Even more important, the gage assembly is supported at the top of the soil tube, and sealed into the single opening at the top of the soil tube, by means of a single supporting assembly forming a cap fitting over the top of the soil tube and having a sealing member fitting inside the soil tube. Both the seal and support are effected without the use of threads, clamps or latches of any sort. This not only makes the attachment to, and removal of the gage assembly from the soil tube simpler, it reduces costs of manufacture of the instrument. Thus, a soil tube is made from sections of rigid plastic tubing by merely cementing a porous ceramic cup to one end of the tube. The other end of the tube does not require machining, threading or other operation which has been required on tensiometer soil tubes of the prior art.

Although certain embodiments of my invention are shown and described herein, the invention is not to be limited thereto. I desire to include in the scope of my invention all the novelty within the scope of the appended claims.

I claim:

1. A soil-moisture tensiometer comprising a transparent, cylindrical soil tube, a porous ceramic cup having substantially the same diameter as said soil tube sealed to the lower end of said soil tube, and a vacuum gage assembly removably attached through a single opening provided at the top of and in axial alignment with said soil tube, the gage of said gage assembly being a Bourdon-type vacuum gage and communicating through tubular means with the interior of said soil tube, and gage assembly comprising sealing means consisting of a resilient boot having an external circular ridge intermediate between the ends thereof and normally contacting and forming a seal against the inside wall of said soil tube, and means for stretching said boot lengthwise to decrease the diameter of said external ridge.

2. A soil-moisture tensiometer according to claim 1 having means for preventing entrance of air into said gage upon removal of said gage assembly from said soil tube.

3. A soil-moisture tensiometer comprising a soil tube, a porous ceramic cup sealed to the lower end of said soil tube and a vacuum gage assembly removably attached through a single opening provided at the upper end of said soil tube, the gage of said gage assembly communicating through tubular means with the interior of said soil tube, said gage assembly comprising resilient sealing means to effect a vacuum seal between said gage assembly and the inner wall of said soil tube, said sealing means comprising a resilient boot having an external circular ridge intermediate between the ends thereof, and means for stretching the boot lengthwise to decrease the external diameter of said ridge; said tensiometer having means for preventing entrance of air into said gage upon removal of said gage assembly from said soil tube comprising an axis self-filling water reservoir supported by and covering the lower open end of said tubular means.

4. A soil-moisture tensiometer comprising a soil tube, a porous ceramic cup sealed to the lower end of said soil tube and a vacuum gage assembly adapted to be supported and removably sealed to the upper end of said soil tube, said gage assembly comprising a vacuum gage, means for supporting said gage at the upper end of said soil tube, and resilient sealing means for effecting a vacuum seal between said assembly and the inside wall of said soil tube, said soil tube having a single opening at the top thereof, said resilient sealing means comprising a boot having a supporting external circular flange at its upper end, an intermediate hollow cylindrical section having an external circular ridge intermediate between the ends thereof, the ridge normally contacting and forming a seal between said boot and the internal wall of said soil tube, and a lower hollow cylindrical section into which a metal tube sealed into and extending downwardly from said gage is inserted and forms a seal.

5. A soil-moisture tensiometer comprising a soil tube, a porous ceramic cup sealed to the lower end of said soil tube and a vacuum gage assembly adapted to be supported and removably sealed to the upper end of said soil tube, said gage assembly comprising a vacuum gage, means for supporting said gage at the upper end of said soil tube, and resilient sealing means for effecting a vacuum seal between said assembly and the inside wall of said soil tube, said soil tube having a single opening at the top thereof, said sealing means comprising a resilient boot having an external circular flange at its upper end forming a support for said boot in said gage assembly, an intermediate hollow cylindrical section having an external circular ridge intermediate between the ends thereof, said intermediate section being unsupported over the portion adjacent said circular ridge, and a lower hollow cylindrical section into which extends a metal tube which is sealed to and communicates with said vacuum gage, said circular ridge normally being of greater diameter than the inside diameter of said soil tube.

6. A soil-moisture tensiometer comprising a soil tube, a porous ceramic cup sealed to the lower end of said soil tube and a vacuum gage assembly adapted to be supported and removably sealed to the upper end of said soil tube, said gage assembly comprising a vacuum gage, means for supporting said gage at the upper end of said soil tube, and resilient sealing means for effecting a vacuum seal between said assembly and the inside wall of said soil tube, said soil tube having a single opening at the top thereof, said sealing means comprising a Neoprene boot supported at its upper end in said gage assembly and having an external circular ridge intermediate between the ends of said boot, said boot being unsupported over the portion adjacent said ridge, a metal tube sealed to and communicating with said gage and extending from said gage downwardly and passing movably through guide means supported at the top of the soil tube and through the upper sections of said boot, the lower end of said tube extending into the lower hollow cylindrical section of said boot, and being sealed thereinto, and providing and maintaining communication between the gage and the interior of the soil tube, said metal tube constituting means for stretching said boot to reduce the diameter of the circular ridge and break the seal between said circular ridge and the inside wall of said soil tube.

7. A soil-moisture tensiometer according to claim 6 having spring means to support the weight of said vacuum gage, thus preventing stretching said resilient boot out of its normal shape.

8. A soil-moisture tensiometer according to claim 6 having a dirt shield comprising a resilient washer sealed to the upper surface of said guide means and forming a seal against the external surface of said metal tube.

References Cited in the file of this patent

UNITED STATES PATENTS

| 516,667 | Wagner | Mar. 20, 1894 |
| 2,556,297 | Rheude | June 12, 1951 |
| 2,878,671 | Prosser | Mar. 24, 1959 |

FOREIGN PATENTS

| 435,815 | Germany | Oct. 18, 1926 |